United States Patent
Yi

(10) Patent No.: US 10,949,226 B2
(45) Date of Patent: Mar. 16, 2021

(54) DISPLAY METHOD OF MULTI-APPLICATION BASED ON ANDROID SYSTEM, AND TERMINAL DEVICE

(71) Applicant: BOE Technology Group Co., Ltd., Beijing (CN)

(72) Inventor: Zhusong Yi, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/559,740

(22) Filed: Sep. 4, 2019

(65) Prior Publication Data
US 2020/0210213 A1    Jul. 2, 2020

(30) Foreign Application Priority Data
Jan. 2, 2019    (CN) .......................... 201910002929.0

(51) Int. Cl.
*G06F 3/048* (2013.01)
*G06F 9/451* (2018.01)
*G06F 9/445* (2018.01)

(52) U.S. Cl.
CPC .......... *G06F 9/451* (2018.02); *G06F 9/44521* (2013.01)

(58) Field of Classification Search
CPC .... G06F 3/0481; G06F 9/451; G06F 3/04842; G06F 3/1415; G09G 2340/0485; G09G 5/363; H04L 51/046; A63F 13/12
See application file for complete search history.

(56) References Cited

U.S. PATENT DOCUMENTS

| | | | | |
|---|---|---|---|---|
| 8,863,126 B2* | 10/2014 | Poore | ......................... | G06F 8/00 718/1 |
| 2009/0085920 A1* | 4/2009 | Teng | ...................... | G06F 3/1415 345/520 |
| 2012/0050334 A1* | 3/2012 | Velthoven | .................. | G06T 7/44 345/660 |
| 2014/0096025 A1* | 4/2014 | Mandel | .................... | H04L 67/34 715/739 |
| 2014/0115606 A1* | 4/2014 | Hamzata | .............. | G06F 9/45533 719/313 |
| 2014/0250106 A1* | 9/2014 | Shapira | .................. | G06F 16/248 707/722 |
| 2015/0193904 A1* | 7/2015 | Vermeulen | ............... | G06F 9/542 345/522 |
| 2018/0035126 A1* | 2/2018 | Lee | ........................ | H04N 19/503 |
| 2018/0061311 A1* | 3/2018 | Lin | ........................ | G09G 3/3233 |
| 2019/0121682 A1* | 4/2019 | Adiletta | ..................... | G06F 9/48 |

OTHER PUBLICATIONS

William Enck; Defending Users Against Smartphone Apps: Techniques and Future Directions; Publisher: Springer, Berlin, Heidelberg ; 2011; 22 pages.*

* cited by examiner

*Primary Examiner* — Linh K Pham
(74) *Attorney, Agent, or Firm* — Arent Fox LLP; Michael Fainberg

(57) ABSTRACT

A display method of multi-application based on an Android system and a terminal device are provided. The display method includes: upon reception of a first instruction, determining whether a first application is a non-Android application, where the first instruction is configured to start the first application; when the first application is the non-Android application, invoking a non-native display module; and drawing a display interface of the first application based upon the non-native display module.

17 Claims, 3 Drawing Sheets

DISPLAY METHOD OF MULTI-APPLICATION BASED ON ANDROID SYSTEM, AND TERMINAL DEVICE

CROSS-REFERENCES TO RELATED APPLICATION

This application claims priority to Chinese patent application No. 201910002929.0 filed on Jan. 2, 2019, which is incorporated herein by reference in its entirety.

FIELD

The present disclosure relates to the field of communication technologies, and particularly to a display method of multi-application based on Android system, and a terminal device.

BACKGROUND

The Android system is an open source operating system, which is generally applicable to mobile devices, e.g., a smart mobile phone, a tablet computer, etc. Typically the Android applications written in Java can satisfy most application scenarios, but the applications written in Java may not process data as efficiently as applications written in the more underlying C or C++ languages in terms of their efficiency of data processing, so the applications written in Java and applications written in the C or C++ languages generally coexist.

One operating system, e.g., the Android system, is generally run on the existing terminal devices, so the terminal devices can only run applications supported by the Android system, but can not run applications supported by any other system, or can run application, supported by another system, written in a standard framework based upon the Android system, e.g., applications written in the C or C++ languages, which are mapped to applications written in Java.

However an application display interface in the Android system, which is based upon a standard display framework of the Android system, can not display any application supported by another system than the Android system compatibly.

SUMMARY

In a first aspect, an embodiment of the disclosure provides a display method of multi-application based on an Android system. The display method includes: upon reception of a first instruction, determining whether a first application is a non-Android application, wherein the first instruction is configured to start the first application; when the first application is the non-Android application, invoking a non-native display module; and drawing a display interface of the first application based upon the non-native display module.

In some embodiments, the non-native display module includes a first display module and a second display module, wherein the first display module is a display module based upon a non-Android system, and the second display module is a display module customized based upon a non-standard application framework layer of the Android system; and when the first application is the non-Android application, invoking the non-native display module includes: invoking the non-native display module through a dynamic loading module, wherein the dynamic loading module invokes the first display module or the second display module.

In some embodiments, invoking the non-native display module through the dynamic loading module includes: obtaining an application parameter of the first application through the dynamic loading module, wherein the application parameter indicates a display refresh frequency; and when the display refresh frequency indicated by the application parameter is above a preset threshold, then invoking the first display module through the dynamic loading module.

In some embodiments, invoking the non-native display module through the dynamic loading module further includes: when the display refresh frequency indicated by the application parameter is below or equal to the preset threshold, then invoking the second display module through the dynamic loading module.

In some embodiments, drawing the display interface of the first application based upon the non-native display module includes: when the non-native display module is the second display module, then creating a first display layer via a standard NativeSurface interface in the Android system; and fusing the first display layer with a created display layer to draw the display interface.

In some embodiments, after when the first application is the non-Android application, invoking the non-native display module, the display method further includes: starting a hardware acceleration module, where the hardware acceleration module is configured to provide data channel for display data of the first application, and to transmit the display data through the data channel.

In some embodiments, after the display interface of the first application is drawn based upon the non-native display module, the display method further includes: receiving a second instruction, where the second instruction is configured to start a second application; when the second application is an Android application, backing up display data of the first application into a buffer area; and recovering the backed-up display data into a graphics random access memory unit when switching from the second application to the first application.

In some embodiments, the display method further includes: receiving a third instruction, where the third instruction is configured to start a third application; when the third application is the non-Android application, backing up display data of the first application into a buffer area; and recovering the backed-up display data into a graphics random access memory unit when switching from the third application to the first application.

In some embodiments, the display method further includes: when the first application is an Android application, invoking a native display module, where the native display module is a local display module customized based upon a standard application framework layer of the Android system; and drawing the display interface of the first application based upon the native display module.

In some embodiments, the display method further includes: receiving a fourth instruction, where the fourth instruction is configured to start a fourth application; when the fourth application is the non-Android application, backing up display data of the first application into a buffer area; and recovering the backed-up display data into a graphics random access memory unit when switching from the fourth application to the first application.

In some embodiments, determining whether the first application is the non-Android application, upon reception of the first instruction includes: obtaining a configuration parameter of the first application upon reception of the first instruction, wherein the configuration parameter indicates an application type; and determining whether the first application is the non-Android application according to the configuration parameter.

In some embodiments, determining whether the first application is the non-Android application, upon reception of the first instruction includes: transmitting a request message to a server upon reception of the first instruction, wherein the request message requests for a configuration parameter of the first application, and the configuration parameter indicates an application type; and receiving the configuration parameter from the server; and determining whether the first application is the non-Android application according to the configuration parameter.

In another aspect, an embodiment of the disclosure provides a terminal device. The terminal device includes: at least one processor; and at least one memory connected with the at least one processor, wherein the memory stores instructions executable by the at least one processor, and the at least one processor is configured to execute the instructions stored in the memory: upon reception of a first instruction, to determine whether a first application is a non-Android application, wherein the first instruction is configured to start the first application; when the first application is the non-Android application, to invoke a non-native display module; and to draw a display interface of the first application based upon the non-native display module.

In some embodiments, the non-native display module includes a first display module and a second display module, wherein the first display module is a display module based upon a non-Android system, and the second display module is a display module customized based upon a non-standard application framework layer of the Android system; and the processor is configured to invoke the non-native display module through a dynamic loading module, where the dynamic loading module invokes the first display module or the second display module.

In some embodiments, the processor is configured to obtain an application parameter of the first application through the dynamic loading module, where the application parameter indicates a display refresh frequency; and when the display refresh frequency indicated by the application parameter is above a preset threshold, to invoke the first display module through the dynamic loading module.

In some embodiments, the processor is further configured: when the display refresh frequency indicated by the application parameter is below or equal to the preset threshold, to invoke the second display module through the dynamic loading module.

In some embodiments, the processor is configured: when the non-native display module is the second display module, to create a first display layer via a standard NativeSurface interface in the Android system; and to fuse the first display layer with a created display layer to draw the display interface.

In some embodiments, the processor is configured: after the non-native display module is invoked, to start a hardware acceleration module, where the hardware acceleration module is configured to provide data channel for display data of the first application, and to transmit the display data through the data channel.

In some embodiments, the processor is further configured: after the display interface of the first application is drawn based upon the non-native display module, to receive a second instruction, where the second instruction is configured to start a second application; when the second application is an Android application, to back up display data of the first application into a buffer area; and to recover the backed-up display data into a graphics random access memory unit when switching from the second application to the first application.

In another aspect, an embodiment of the disclosure provides a computer storage medium storing computer program that, when executed by a processor, cause the processor to perform the display method according to any one of the solutions in the first aspect above.

DETAILED DESCRIPTION

Figure 1:
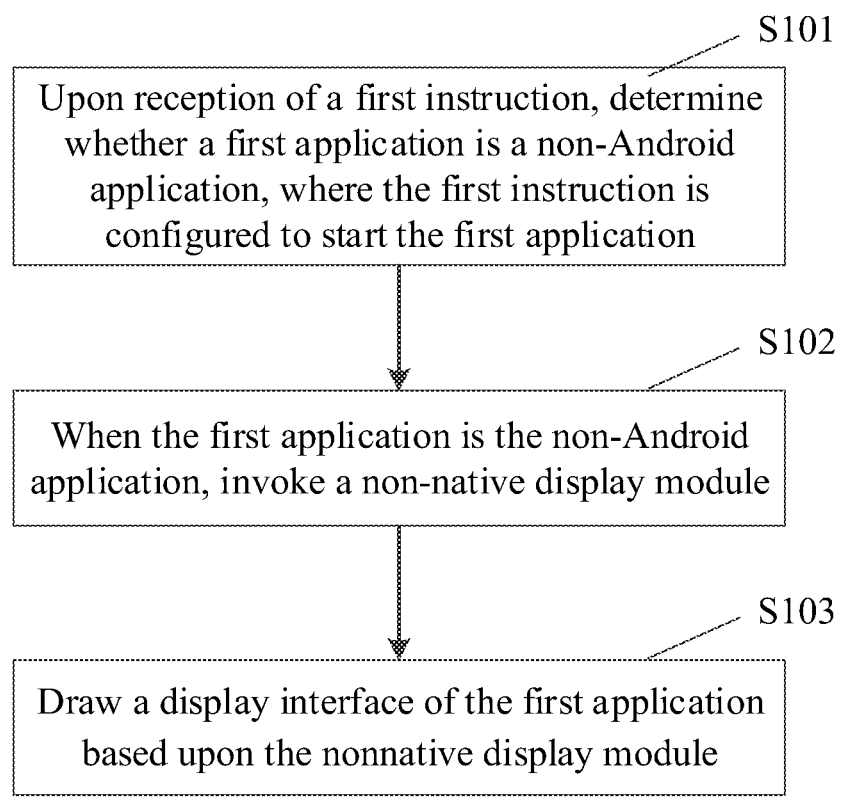
FIG. 1 is a schematic flow chart of a display method of multi-application based on Android system according to an embodiment of the disclosure.

In order to make the objects, technical solutions, and advantages of the disclosure more apparent, the technical solutions according to the embodiments of the disclosure will be described below clearly and fully with reference to the drawings in the embodiments of the disclosure.

Embodiments of the disclosure provide a display method of multi-application based on Android system, and a terminal device so as to display an application supported by non-Android system compatibly.

An embodiment of the disclosure provides a display method of multi-application based on Android system, and in this display method, a local display module interface is added in the Android system to invoke a built-in non-native display module, where the non-native display module is a display module based upon non-Android system, e.g., the non-native display module can be a custom drawing module independent of an application framework layer of the Android system, and packaged in C or C++, or can be a drawing module in which a part of function layers in a standard application framework layer of the Android system are packaged, so that non-Android application can be displayed, that is, an application supported by non-Android system can be displayed compatibly.

In the embodiment of the disclosure, the Android application refers to an application developed based upon the Android system, and the non-Android application refers to an application developed based upon non-Android system, e.g., an application developed based upon the Linux system. Typically the application developed based upon the Linux system is generally developed in the C or C++ language, and can process data at a higher rate than the application developed based upon the Android system.

The technical solution according to the embodiment of the disclosure will be described below with reference to the drawings.

Typically the application developed based upon the Linux system is generally developed in the C or C++ language, and can process data at a higher rate than the application developed based upon the Android system, so non-Android application needs to be run to provide a satisfactory rate of data processing. Terminal devices generally run only one operating system, e.g., the Android system, so the terminal devices can only run applications supported by the Android system, but can not run applications supported by any other system, so that the non-Android application can not be run in the Android system. Even if the non-Android application is installed into the Android system using a third-party plug-in, there are different types of plug-ins for different systems, that is, the third-party plug-ins can not be compatible between the different systems, so that the non-Android application can not be run in the Android system.

In view of this, in the embodiment of the disclosure, a new display module interface is added in the Android system to invoke a built-in display module to display non-Android application, so as to display an application supported by non-Android system compatibly. In order to display non-Android application compatibly, a non-native display module is added in the embodiment of the disclosure to display non-Android application.

The technical solution according to the embodiment of the disclosure will be described below with reference to the drawings.

Figure 2:
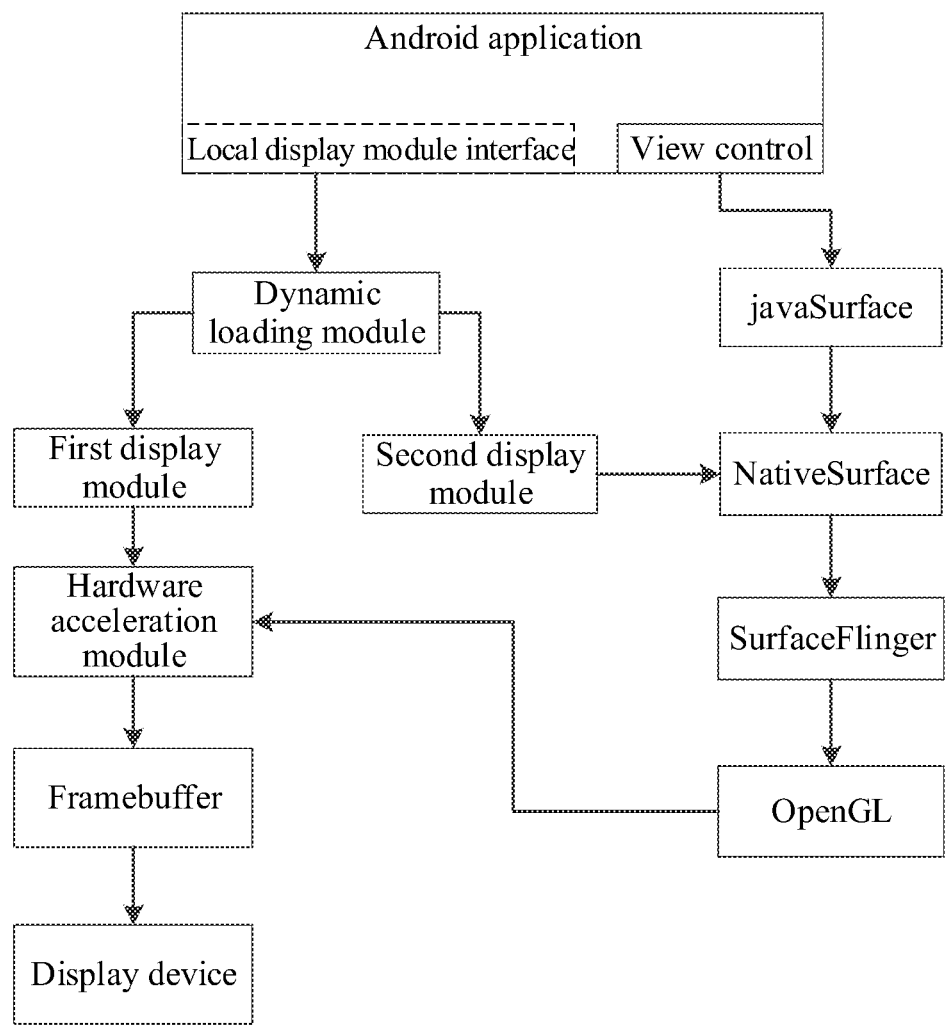
FIG. 2 is a schematic diagram of a framework of multi-application in an Android system according to an embodiment of the disclosure.

As illustrated in FIG. 1 and FIG. 2, a display method of multi-application based on Android system according to an embodiment of the disclosure can be performed by a terminal device on which the Android system is installed, e.g., a mobile phone, a tablet computer, etc., and a specific flow of the method is as follows.

The step S101 is to determine whether a first application is a non-Android application, upon reception of a first instruction, the first instruction is configured to start the first application.

A user can input the first instruction to the terminal device to start the first application. The terminal device can determine whether the first application is a non-Android application upon reception of the first instruction, and further invoke different display module interfaces according to a determination result, so that an application interface of the non-Android application can be displayed.

In a specific implementation, there may be the following two implementations in which it is determined whether the first application is the non-Android application in the embodiment of the disclosure.

In a first implementation:

The terminal device can obtain a configuration parameter of the first application upon reception of the first instruction, where the configuration parameter indicates an application type, so the terminal device can parse the configuration parameter to thereby determine whether the first application is the non-Android application. In this implementation, the configuration parameter can be carried in descriptive information, version information, etc., of the first application, although the embodiment of the disclosure will not be limited thereto.

In a second implementation:

The terminal device can send a request message to a server upon reception of the first instruction, where the request message requests for a configuration parameter of the first application, and the configuration parameter indicates an application type. The server can obtain the configuration parameter of the first application upon reception of the request message, and further transmit the obtained configuration parameter to the terminal device, so the terminal device can determine whether the first application is the non-Android application according to the configuration parameter from the server.

The step S102 is, when the first application is the non-Android application, to invoke a non-native display module.

When the terminal device determines that the first application is an Android application, then the terminal device invokes a native display module interface provided by the Android system, e.g., a View control as illustrated in FIG. 2, to invoke a native display module provided by the Android system through the View control to display an application interface of the Android application. The native display module is configured to display an application interface of the Android application based upon a plurality of interfaces involved in a standard application framework layer of the Android system, e.g., a javaSurface interface, a NativeSurface interface, etc., successively, and further based upon the standard application framework layer, for example, layers are fused through SurfaceFlinger, layers are rendered through OpenGL, etc. The native display module can display the interface of the Android application as in the prior art, and this is not a focus in the embodiment of the disclosure, so a repeated description thereof will be omitted here.

When the terminal device determines that the first application is the non-Android application, then the terminal device invokes a new added local display module interface as illustrated in FIG. 2, to invoke a non-native display module through the local display module interface to display an application interface of the non-Android application. In some embodiments, the local display module interface can be additionally arranged based on a Java layer (an application layer) of the Android system, and the local display module interface can declare all display operations of the non-native display module, so that the non-native display module can be invoked to display the non-Android application by invoking resources as needed via the local display module interface. Since the local display module interface is actually invisible as opposed to the View control (visible), it is illustrated in a dotted line in FIG. 2.

In some embodiments, different non-Android applications may have different display demands, for example, some non-Android application is a game application, an interface of the non-Android application needs a high display refresh frequency as needed in reality for a game player; and in another example, some non-Android application is a non-game application, so even if an interface of the non-Android application is refreshed infrequently, then a user may not be significantly affected. Accordingly in the embodiment of the disclosure, since different non-Android applications have different display demands, a plurality of non-native display modules can be arranged, where the different non-native display modules correspond to non-Android applications with different display refresh frequencies.

Since there are different non-native display modules, which one of the non-native display modules to be invoked shall be determined. Accordingly in the embodiment of the disclosure, a dynamic loading module is additionally arranged, and when an interface of some application needs to be displayed, then the local display module interface may invoke the dynamic loading module to select and load one of the non-native display modules. After some application is started, the dynamic loading module can invoke one of the non-native display modules according the display demands of the application in the embodiment of the disclosure.

In the embodiment of the disclosure, a plurality of display modules can be arranged in advance, different display modules draw an application interface in different display modes, so the different display modules can be invoked dynamically according to a refresh frequency required by the application, to thereby satisfy display demands of respective application interfaces.

Specifically how the dynamic loading module invokes the non-native display module as needed for the application to be displayed, by way of an example in which two non-native display modules including a first display module and a second display module, are arranged in advance in the embodiment of the disclosure. The first display module is configured to display a non-Android application with a higher refresh frequency, and the second display module is configured to display a non-Android application with a lower refresh frequency.

In a possible implementation, in the embodiment of the disclosure, the first display module is configured to display a non-Android application with a higher refresh frequency, so the first display module can be a display module which is independent of the application framework layer of the Android system, and packaged in the C or C++ language, and which can directly draw an application interface to be displayed. For example, all display operations on the application interface can be packaged in the first display module, e.g., creating a layer using the function CreateSurface, destroying a layer using the function DestroySurface, getting a display layer using the function GetDisplaySurface, overwriting layer data using the function Blit, filling layer data using the function Fill, displaying a layer in synchronization using the function Sync, etc. These display functions as mentioned above can be display functions customized as needed, and packaged into the first display module which is a non-native display module. Since the native display module which is a display module configured to display an application interface based upon the application framework layer of the Android system shall be completely structured in the package structure of the application framework layer, and there are a number of function layers involved at the application framework layer of the Android system shall be completely structured in the package structure of the application framework layer, an application interface shall be displayed by invoking the application layers, so it needs take a longer time period to draw the interface inefficiently. In the embodiment of the disclosure, the first display module is a display function customized in a package in the C or C++ language, and it can directly draw an application interface to be displayed, so it needs take a shorter time period to draw the interface; and the C or C++ language is more underlying than the Java language for the Android system, so data can be processed more efficiently to thereby display the non-Android application at a higher refresh frequency.

In a possible implementation, in the embodiment of the disclosure, the second display module is configured to display the non-Android application with a lower display refresh frequency, so the second display module can be a display module into which a part of the standard application framework layer of the Android system, e.g., a part of NativeSurface interfaces of the Android standard application framework layer, or a part of interfaces of the OpenGL ES graph library, are packaged.

For example, the function NativeSurface_Create for creating a layer, the function NativeSurface_Destroy for destroying a layer, the function NativeSurface_GetDisplaySurface for getting a display layer, the function NativeSurface_Blit for overwriting layer data, the function NativeSurface_Fill for filling layer data, the function NativeSurface_Sync for displaying a layer in synchronization, etc., provided by the NativeSurface interfaces of the Android standard application framework layer can be packaged into the second display module. As opposed to a native display module into which all function layers provided by the NativeSurface interfaces are packaged, only a part of the functions provided by the NativeSurface interfaces, i.e., a part of the function layers, are packaged into the second display module, and since less function layers are invoked to display an application interface of the non-Android application, so the application interface can be displayed more quickly in the embodiment of the disclosure as compared with displaying an application interface by invoking all function layers of the application frame layer of the Android system.

Alternatively the second display module can be achieved by packaging the interfaces in the OpenGL ES graph library, that is a part of interfaces in the OpenGL ES graph library can be packaged into the second display module. However the OpenGL ES graph library is so huge that there are thousands of interfaces, a display function can be packaged only if a human programmer grasps the OpenGL ES graph library; otherwise, a display function can not be packaged in a short time period, so the human programmer shall be highly skillful. In the embodiment of the disclosure, only tens of NativeSurface graphic display functions are packaged into the second display module, so they can be packaged more quickly and efficiently with a less effort than the interfaces of the OpenGL ES graphic library.

Moreover there are also some special rendering operations among OpenGL graphic operations, thus degrading the display performance. Accordingly in the embodiment of the disclosure, the first display module, and the second display module into which the NativeSurface interfaces are packaged can perform only a native display operation on a graph without any OpenGL processing thereon and thus any optimum rendering thereof to thereby further improve the display performance.

In the embodiment of the disclosure, the local display module interface can declare all display operations packaged in the first display module, and all display operations packaged in the second display module, so that the first display module or the second display module can be invoked via the local display module interface.

In a possible implementation, in the embodiment of the disclosure, the dynamic loading module can determine to invoke the first display module or the second display module, according to a display demand of the non-Android application to be displayed. For example, the first display module can display the application with a display refresh frequency above 100 Hz, and the second display module can display the application with a display refresh frequency below or equal to 100 Hz.

Before the display module is loaded, the dynamic loading module can firstly determine a display demand, e.g., a display refresh frequency demand, of the non-Android application to thereby invoke a corresponding display module according to the display refresh frequency demand. Specifically the dynamic loading module can obtain an application parameter of the first application, where the application parameter indicates a display refresh frequency. For example, the application parameter can be a display refresh frequency, or can be an application type parameter, and for example, when the application type parameter indicates that the first application is a game application, then it may be determined that the display refresh frequency of the first application is high. In the embodiment of the disclosure, when it is determined according to the application parameter that the display refresh frequency of the first application is above a preset threshold, then the dynamic loading module invokes the first display module; otherwise, that is, when the terminal device determines according to the application parameter that the display refresh frequency of the first application is below or equal to the preset threshold, then the dynamic loading module invokes the second display module. For example, the preset threshold may be 100 Hz, and when the dynamic loading module determines that the non-Android application to be displayed requires a display refresh frequency above 100 Hz, then the dynamic loading module invokes the first display module; and when the dynamic loading module determines that the non-Android application to be displayed requires a display refresh frequency below or equal to 100 Hz, then the dynamic loading module invokes the second display module.

Of course, in the embodiment of the disclosure, the dynamic loading module can alternatively invoke the first display module due to another factor upon determining that the non-Android application to be displayed requires a display refresh frequency below or equal to 100 H. For example, when the non-Android application is a game application, then the first display module is invoked, and when the non-Android application is a video application, then the second display module is invoked.

In a possible implementation, in the embodiment of the disclosure, the dynamic loading module can further output prompt information before invoking the first display module or the second display module, to instruct the user to select the display module to be invoked. For example, the dynamic loading module can output a prompt window in which a button corresponding to the first display module and a button corresponding to the second display module can be arranged, and the user can click on one of the buttons, so the dynamic loading module can determine which one of the display modules is selected by the user, according to a clicking operation of the user, and further invoke the first display module or the second display module according to a real demand of the user to thereby satisfy the real demand of the user so as to improve the experience of the user.

In the embodiment of the disclosure, the first display module customized in the C or C++ language can process data more efficiently than the Java language, and better satisfy a demand for a higher display refresh frequency than a non-native display module produced by jni-passing a display of the View control. This is because the View control is virtually jni-passed using codes written in the C language based upon program written in the Java language in a jni manner, and although data can be processed more efficiently, the performance of drawing an interface may be seriously affected by inverse jni invocation, thus failing to satisfy the demand for a higher refresh frequency. For example, if the osg interface of the coship middleware is packaged for jni-passing a display of the View control, then the demand for a higher refresh frequency may not be satisfied. In the embodiment of the disclosure, there is no inverse invocation to be required for the first display module customized in the C or C++ language, that is, no parameter needs to be passed in return, so the demand for a display higher refresh frequency can be satisfied.

The step S103 is to draw a display interface of the first application based upon the non-native display module.

In the embodiment of the disclosure, the display interface of the first application can be drawn based upon the non-native display module after the non-native display module is invoked. For example, in the embodiment of the disclosure, the application interface of the first application can be displayed through the first display module or the second display module after the first display module or the second display module is invoked.

However the first display module or the second display module sometimes may still fail to display the application interface of the first application as needed in reality, and for example, the display refresh frequency required by the first application may be even higher, so in the embodiment of the disclosure, a hardware acceleration module built in the terminal device, e.g., a graphic Two Dimensional Engine (TDE), can be further started after the first display module or the second display module is invoked, where the hardware acceleration module is configured to provide a data channel for display data of the first application, and to transmit the display data through the data channel. For example, the first display module transmits the display data of the first application to a graphics random access memory unit through the data channel provided by the hardware acceleration module, or the second display module transmits the display data of the first application to respective layers through the data channel provided by the hardware acceleration module. As compared with the process of drawing by the first display module the display interface of the first application by firstly retrieving the display data from a plurality of random access memory units sequentially, and then storing the retrieved display data into a display unit sequentially, in the embodiment of the disclosure, all display data are transmitted directly to the graphics random access memory unit through the data channel provided by the hardware acceleration module so that the display data can be retrieved in a shorter time period, to thereby display the application interface of the first application more quickly. Alike the second display module transmits the display data of the first application to the respective layers through the data channel provided by the hardware acceleration module in a shorter time period than transmitting the display data layer by layer to thereby display the application interface of the first application more quickly.

In the embodiment of the disclosure, the TDE can be started by default after the first display module or the second display module is invoked, to thereby better satisfy the demand of the user so as to improve the experience of the user. In a possible implementation, in the embodiment of the disclosure, prompt information can be further output after the first display module or the second display module is invoked, to instruct the user to determine whether to start the TDE. For example, in the embodiment of the disclosure, a prompt window, in which a Yes button for starting the TDE and a No button can be arranged, can be output after the first display module or the second display module is invoked. When the user clicks on the Yes button, then it is determined in the embodiment of the disclosure to start the TDE, according to the input of the user, and when the user clicks on the No button, then it is determined in the embodiment of the disclosure not to start the TDE, so that the real demand of the user can be better satisfied, and when the user determines not to start the TDE, the real demand of the user can be satisfied, but also power consumption of the terminal device can be saved.

In the embodiment of the disclosure, the second display module can be formed by packaging a part of the function layers provided by the NativeSurface interfaces of the Android standard application framework layer, so the second display module can draw and display the application interface of the first application by creating a first display layer via the NativeSurface interfaces in the standard of the Android system, and fusing the first display layer with a created display layer, e.g., a created background layer, or a created layer corresponding to another image to be displayed, based upon a part of the function layers of the application framework layer of the Android system to draw the display interface. The layers can be fused through SurfaceFlinger, so a repeated description thereof will be omitted here.

In the embodiment of the disclosure, the new added display module can make use of graphic resources provided by the Android system, so that only a part of function layers of the standard application framework layer of the Android system be packaged, that is, codes of some function layers can be transplanted for compatibility with the Android system without developing new codes, and the graphic resources provided by the Android system can be well used.

It shall be noted that the layers are fused at the Native-Surface level of the Android system, and Surface display layers belonging to different display layers are created respectively for respective Android applications, so the respective applications can be displayed without affecting each other, and thus the respective Android applications can be switched to each other without hindering the respective Android applications from being displayed. In the embodiment of the disclosure, the second display module fuses the newly created display layers with the created display layers of the respective applications, and the respective display layers do not affect each other, thus enabling free switching between non-Android application and an Android application. For example, an application being currently run is a non-Android application, displayed by the second display module, and when an instruction to start an Android application is received, then a display layer required for displaying an interface of the Android application can be created, and the display layers can be fused and displayed. At this time, when an instruction to restart the non-Android application is received, then a display layer required for displaying an interface of the non-Android application can be created, and the display layers can be fused and displayed. Since the created display layers do not affect each other, the second display module can enable free switching between the non-Android application and the Android application.

In the embodiment of the disclosure, the first display module displays the application interface of the first application by buffering the display data directly in a buffer area (e.g., a random access memory unit), and copying the display data from the random access memory into a graphics random access memory Framebuffer to display the application interface. Since Framebuffer is registered into the Android system in advance in the form of a module, it can be well created during initialization. Other data to be displayed can not be displayed when Framebuffer is occupied, and new data can be displayed only if Framebuffer is idle. Since there is only one Framebuffer, and the display of one application may be overwritten with the display of another application, in the embodiment of the disclosure, Framebuffer is occupied most of the time after the first display module is started; and at this time, when the user switches from the non-Android application to the Android application, then the display data of the Android application can not be stored into Framebuffer timely because Framebuffer is occupied, thus resulting in a black screen.

Accordingly when the first application is a non-Android application, in the embodiment of the disclosure, after the first display module is invoked, the display data of the first application can be backed-up into the buffer area, and when switching back to the first application, that is, when the interface of the first application is drawn again, the backed-up display data is recovered into the graphics random access memory unit Framebuffer. Stated otherwise, in order to switch from one non-Android application to another non-Android application, the terminal device backs-up display data of the one non-Android application into the buffer area in advance, and when switching from the another non-Android application back to the one non-Android application, that is, when drawing again the one Android application, the backed-up display data is recovered into the graphics random access memory unit Framebuffer. How to invoke the first display module to switch from one non-Android application to another non-Android application or an Android application will be described below in connection with several scenarios thereof.

First Scenario

In the embodiment of the disclosure, when a first application started by the terminal device is a non-Android application, then upon subsequent reception of a second instruction to start a second application which is an Android application, i.e., to switch from the non-Android application to the Android application, the terminal device may back-up display data of the first application into a buffer area, and when switching from the second application to the first application, that is, when drawing again an interface of the first application, the backed-up display data is recovered into a graphics random access memory unit.

Second Scenario

When a first application started by the terminal device is a non-Android application, then upon subsequent reception of a third instruction to start a third application which is a non-Android application, i.e., to switch from the non-Android application to another non-Android application, the terminal device may back-up display data of the first application into a buffer area, and when switching from the third application to the first application, that is, when drawing again an interface of the first application, the backed-up display data is recovered into a graphics random access memory unit.

Third Scenario

When a first application started by the terminal device is an Android application, then upon subsequent reception of a fourth instruction to start a fourth application which is a non-Android application, i.e., to switch from the Android application to the non-Android application, the terminal device may back-up display data of the first application into a buffer area, and when switching from the fourth application to the first application, that is, when drawing again an interface of the first application, the backed-up display data is recovered into a graphics random access memory unit.

In the three scenarios above, the terminal device switches from the second application (or the third application or the fourth application) back to the first application by recovering the backed-up display data into the graphics random access memory unit Framebuffer, that is, overwriting display data of the second application (or the third application or the fourth application) with the display data of the first application, to thereby display the first application. In order to avoid a black screen from occurring, in the embodiment of the disclosure, the backed-up display data can be recovered into the graphics random access memory unit through the hardware acceleration module so that the display data of the first application can be recovered into the graphics random access memory unit timely.

In the embodiment of the disclosure, when an application is to be started based upon the Android system, it is firstly determined whether the application to be started is an Android application, and if so, then a native display module of the Android system can be invoked to display the application to be started. If the application to be started is a non-Android application, then a new added local display module interface is invoked to invoke a new added non-native display module to display the application to be started.

In the embodiment of the disclosure, the non-native display module includes a first display module based upon non-Android system, and a second display module customized based upon non-standard application framework layer of the Android system. The first display module can display non-Android application with a higher display refresh frequency, and the second display module can display non-Android application with a lower display refresh frequency. Accordingly furthermore in the embodiment of the disclosure, after the application to be started is determined as the non-Android application, it can be further determined whether a display refresh frequency of the application to be started is high or low, so that a dynamic loading module can be arranged to invoke the first display module or the second display module to display the non-Android application, according to the high or low display refresh frequency.

In order to further improve the efficiency of displaying the application, in the embodiment of the disclosure, after the first display module or the second display module is invoked, a hardware acceleration module can be further started so that the hardware acceleration module provides a data channel, and transmits all display data directly to a graphics random access memory unit through the data channel, so an interface of the application to be started can be displayed more quickly. After the first display module starts the non-Android application, when an instruction to start another application, e.g., another non-Android application or an Android application, is received, then in the embodiment of the disclosure, the display data of the non-Android application is backed-up into a buffer area, and when switching from the another application back to the non-Android application, that is, when the interface of the non-Android application is drawn again, the backed-up display data is recovered into the graphics random access memory unit through the hardware acceleration module. Alternatively in the embodiment of the disclosure, after the Android application is started, when an instruction to start non-Android application is received at this time in the embodiment of the disclosure, then display data of the Android application is backed-up into the buffer area in the embodiment of the disclosure, and when switching from the non-Android application back to the Android application, that is, when an interface of the Android application is drawn again, the backed-up display data is recovered into the graphics random access memory unit through the hardware acceleration module. In this way, switching between the non-Android application and the Android application can be made by storing the display data to be displayed into Framebuffer timely, to thereby avoid a black screen from occurring.

In summary, the embodiment of the disclosure provides a method for displaying a plurality of applications in an Android system, and in this method, a local display module interface is added in the Android system to invoke a built-in non-native display module, where the non-native display module is a customized drawing module, e.g., a drawing module independent of an application framework layer of the Android system, and packaged in C or C++, or a drawing module in which a part of function layers at the standard application framework layer of the Android system are packaged, so that non-Android application can be displayed, that is, an application supported by non-Android system can be displayed compatibly.

A device according to an embodiment of the disclosure will be described below with reference to the drawings.

Figure 3:
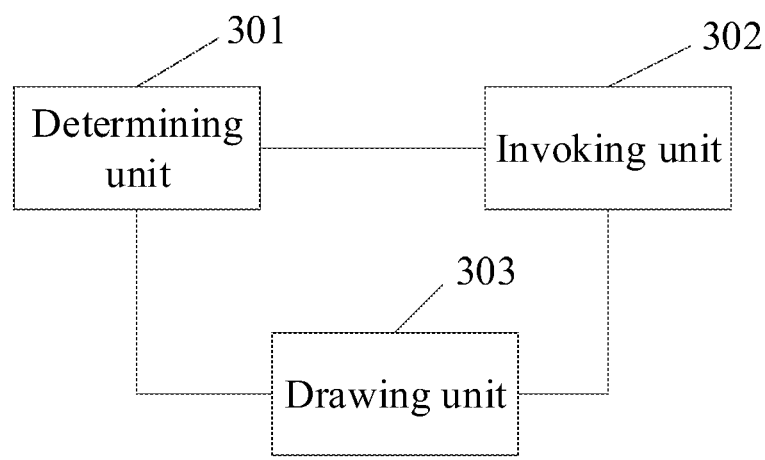
FIG. 3 is a schematic structural diagram of a terminal device according to an embodiment of the disclosure.

As illustrated in FIG. 3, based upon the same inventive idea, an embodiment of the disclosure provides a terminal device. The terminal device includes a determining unit 301, an invoking unit 302, and a drawing unit 303. The determining unit 301 is configured, upon reception of a first instruction, to determine whether a first application is a non-Android application, wherein the first instruction is configured to start the first application, the invoking unit 302 is configured, when the first application is the non-Android application, to invoke a non-native display module, and the drawing unit 302 is configured to draw a display interface of the first application based upon the non-native display module.

In some embodiments, the non-native display module includes a first display module and a second display module, where the first display module is a display module based upon a non-Android system, and the second display module is a display module customized based upon a non-standard application framework layer of the Android system; and the invoking unit 302 is configured: to invoke the non-native display module through a dynamic loading module, where the dynamic loading module invokes the first display module or the second display module.

In some embodiments, the invoking unit 302 is configured: to obtain an application parameter of the first application through the dynamic loading module, where the application parameter indicates a display refresh frequency; and when the display refresh frequency indicated by the application parameter is above a preset threshold, to invoke the first display module through the dynamic loading module.

In some embodiments, the invoking unit 302 is further configured: when the display refresh frequency indicated by the application parameter is below or equal to the preset threshold, to invoke the second display module through the dynamic loading module.

In some embodiments, the drawing unit 303 is configured: when the non-native display module is the second display module, to create a first display layer via a standard Native-Surface interface in the Android system; and to fuse the first display layer with a created display layer to draw the display interface.

In some embodiments, the device further includes a starting unit configured: after the non-native display module is invoked, to start a hardware acceleration module, where the hardware acceleration module is configured to provide data channel for display data of the first application, and to transmit the display data through the data channel.

In some embodiments, the drawing unit 303 is further configured: after the display interface of the first application is drawn based upon the non-native display module, to receive a second instruction, where the second instruction is configured to start a second application; when the second application is an Android application, to back up display data of the first application into a buffer area; and to recover the backed-up display data into a graphics random access memory unit for switching from the second application to the first application.

In some embodiments, the drawing unit 303 is further configured: to receive a third instruction, where the third instruction is configured to start a third application; when the third application is the non-Android application, to back up display data of the first application into a buffer area; and to recover the backed-up display data into a graphics random access memory unit for switching from the third application to the first application.

In some embodiments, the drawing unit 303 is further configured: when the first application is an Android application, to invoke a native display module which is a local display module customized based upon a standard application framework layer of the Android system; and the drawing unit 303 is further configured to draw the display interface of the first application based upon the native display module.

In some embodiments, the drawing unit 303 is further configured: to receive a fourth instruction, where the fourth instruction is configured to start a fourth application; when the fourth application is the non-Android application, to back up display data of the first application into a buffer area; and to recover the backed-up display data into a graphics random access memory unit for switching from the fourth application to the first application.

In some embodiments, the determining unit 301 is configured: to obtain a parameter of the first application upon reception of the first instruction, where the configuration parameter indicates an application type; and to determine whether the first application is the non-Android application according to the configuration parameter.

In some embodiments, the determining unit 301 is configured: to transmit a request message to a server upon reception of the first instruction, where the request message requests for a configuration parameter of the first application, and the configuration parameter indicates an application type; and to receive the configuration parameter from the server; and to determine whether the first application is the non-Android application according to the configuration parameter.

The terminal device can perform the display method of multi-application based on Android system according to the embodiment of the disclosure, so for details of the functions which can be performed by the respective functional modules in the terminal device, reference can be made to the description of the display method of multi-application based on Android system according to the embodiment of the disclosure, and a repeated description thereof will be omitted here.

Figure 4:
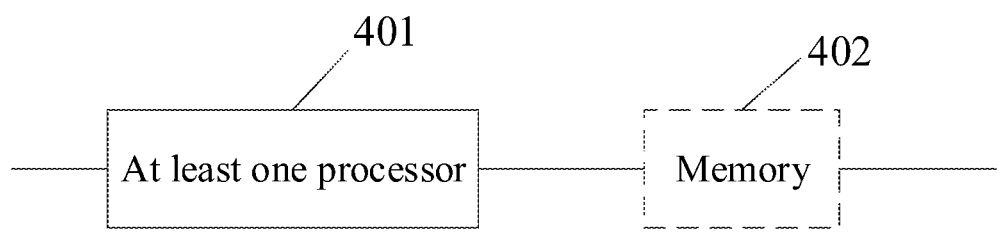
FIG. 4 is another schematic structural diagram of a terminal device according to an embodiment of the disclosure.

As illustrated in FIG. 4, based upon the same idea, an embodiment of the disclosure provides another terminal device. The terminal device can include at least one processor 401 configured to execute computer program stored in a memory to perform the steps in the display method of multi-application based on an Android system according to the embodiment of the disclosure.

Specifically, the processor 401 is configured to execute computer program, upon reception of a first instruction, to determine whether a first application is a non-Android application, wherein the first instruction is configured to start the first application; when the first application is the non-Android application, to invoke a non-native display module; and to draw a display interface of the first application based upon the non-native display module.

In some embodiments, the non-native display module comprises a first display module and a second display module, wherein the first display module is a display module based upon a non-Android system, and the second display module is a display module customized based upon a non-standard application framework layer of the Android system; and the processor is configured to invoke the non-native display module through a dynamic loading module, wherein the dynamic loading module invokes the first display module or the second display module.

In some embodiments, the processor 401 is configured to obtain an application parameter of the first application through the dynamic loading module, wherein the application parameter indicates a display refresh frequency; and when the display refresh frequency indicated by the application parameter is above a preset threshold, invoke the first display module through the dynamic loading module.

In some embodiments, the processor 401 is configured to, when the display refresh frequency indicated by the application parameter is below or equal to the preset threshold, invoke the second display module through the dynamic loading module.

In some embodiments, the processor 401 is configured, when the non-native display module is the second display module, to create a first display layer via a standard Native-Surface interface in the Android system; and to fuse the first display layer with a created display layer to draw the display interface.

In some embodiments, the processor 401 is configured, after the non-native display module is invoked when the first application is the non-Android application, to start a hardware acceleration module, wherein the hard acceleration module is configured to provide data channel for display data of the first application, and to transmit the display data through the data channel.

In some embodiments, the processor 401 is configured, after the display interface of the first application is drawn based upon the non-native display module, to receive a second instruction, wherein the second instruction is configured to start a second application; when the second application is an Android application, to back up display data of the first application into a buffer area; and to recover the backed-up display data into a graphics random access memory unit when switching from the second application to the first application.

In some embodiments, the processor 401 is configured to receive a third instruction, where the third instruction is configured to start a third application; when the third application is the non-Android application, to back up display data of the first application into a buffer area; and to recover the backed-up display data into a graphics random access memory unit when switching from the third application to the first application.

In some embodiments, the processor 401 is further configured, when the first application is an Android application, to invoke a native display module, where the native display module is a local display module customized based upon a standard application framework layer of the Android system; and to draw the display interface of the first application based upon the native display module.

In some embodiments, the processor 401 is further configured to receive a fourth instruction, where the fourth instruction is configured to start a fourth application; when the fourth application is the non-Android application, to back up display data of the first application into a buffer area; and to recover the backed-up display data into a graphics random access memory unit when switching from the fourth application to the first application.

In some embodiments, the processor 401 is configured to obtain a configuration parameter of the first application upon reception of the first instruction, where the configuration parameter indicates an application type; and to determine whether the first application is the non-Android application according to the configuration parameter.

In some embodiments, the processor 401 is configured to transmit a request message to a server upon reception of the first instruction, where the request message requests for a configuration parameter of the first application, and the configuration parameter indicates an application type; and to receive the configuration parameter from the server; and to determine whether the first application is the non-Android application according to the configuration parameter.

In some embodiments, the processor 401 can be a central processor, an Application Specific Integrated Circuit (ASIC), or one or more integrated circuits for controlling the program to be executed.

In some embodiments, the terminal device further includes a memory 402 connected with the at least one processor, where the memory 402 can include a Read Only Memory (ROM), a Random Access Memory (RAM), and a disk memory. The memory 402 is configured to store data for use by the processor 401 in operation, i.e., instructions executable by the at least one processor 401, and the at least one processor 401 can execute the instructions stored in the memory 402 to perform the display method of multi-application based on Android system according to the embodiment of the disclosure. Specifically the number of memories 402 may be one or more. Although the memory 402 is illustrated in FIG. 4, the memory 402 is not a necessary functional module, so it is illustrated in a dotted box in FIG. 4.

Specifically physical devices corresponding to the determining unit 301, the invoking unit 302, and the drawing unit 303 can be the processor 401 above. The terminal device can perform the display method of multi-application based on Android system according to the embodiment of the disclosure, so for details of the functions which can be performed by the respective functional modules in the terminal device, reference can be made to the description of the display method of multi-application based on Android system according to the embodiment of the disclosure, and a repeated description thereof will be omitted here.

An embodiment of the disclosure further provides a computer storage medium storing computer instructions that, when executed by a computer, cause the computer to perform the display method of multi-applications based on Android system according to the embodiment of the disclosure.

Those skilled in the art can clearly appreciate that the respective functional modules above have been described only by way of an example for the sake of convenience and conciseness, but in a real application, the functions above can be allocated to and performed by different functional modules as needed, that is, the internal structure of the terminal device can be divided into different functional modules for performing a part or all of the functions above. For details of a particular operating process of the system, device, and units, reference can be made to the corresponding process in the method embodiment above, and a repeated description thereof will be omitted here.

In the embodiments above of the disclosure, it shall be appreciated that the disclosed method and device can be embodied in other implementations. For example, the embodiment of the device as described above is only exemplary, and for example, the device is only divided into the modules or units according to their logic functions, but the device can be divided otherwise in a real implementation. For example, a plurality of units or components can be combined, or can be integrated into another system, or some features can be omitted, or may not be implemented. Furthermore when they are coupled, or coupled directly, or connected communicatively, they can be connected via some interface, and when they are coupled directly or connected communicatively, they can be coupled or connected electrically, mechanically, or otherwise.

The units described as separate components may or may not be physically separate from each other, and the components illustrated as units may or may not be physical units, that is, they may be collocated or may be distributed onto a number of network elements. A part or all of the modules can be selected as needed in reality for the purpose of the solution according to the embodiments of the disclosure.

Furthermore the respective functional units in the respective embodiments of the disclosure can be integrated into a processing unit, or the respective units can physically exist separately from each other, or two or more units can be integrated into a unit. The integrated units can be embodied in a hardware form, or can be embodied as software functional units.

If the integrated units are embodied as software functional units, and sold or used as separate products, then they may be stored in a computer readable storage medium. Based upon such understanding, the technical solutions according to the disclosure essentially, or their parts contributing to the prior art, or a part or all of the technical solutions can be embodied in the form of a computer software product, which can be stored in a storage medium, and which includes several instructions to cause a computer device (e.g., a personal computer, a server, a network device, etc.) or a processor to perform a part or all of the steps in the method according to the respective embodiments of the disclosure. The storage medium includes a Universal Serial Bus (USB) flash disk, a mobile hard disk, a Read-Only Memory (ROM), a Random Access Memory (RAM), a magnetic-disk, an optical disk, or any other medium which can store program codes.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A display method of multi-application based on an Android system, comprising:
   upon reception of a first instruction, determining whether a first application is a non-Android application, wherein the first instruction is configured to start the first application;
   when the first application is the non-Android application, invoking a non-native display module; and
   drawing a display interface of the first application based upon the non-native display module;
   when the first application is an Android application, invoking a native display module, and creating a Surface display layer of the first application to draw the display interface of the first application, wherein the native display module is a local display module customized based upon a standard application framework layer of the Android system;
   receiving a second instruction, wherein the second instruction is configured to start a second application;
   when the second application is an Android application and the first application is the non-Android application, backing up display data of the first application into a buffer area, and recovering the backed-up display data into a graphics random access memory unit when switching from the second application to the first application;

when the second application is an Android application and the first application is the Android application, creating a Surface display layer of the second application to draw a display interface of the second application; and invoking the Surface display layer of the first application when switching from the second application to the first application.

2. The display method according to claim 1, wherein the non-native display module comprises a first display module and a second display module, wherein the first display module is a display module based upon a non-Android system, and the second display module is a display module customized based upon a non-standard application framework layer of the Android system; and when the first application is the non-Android application, invoking the non-native display module comprises:
invoking the non-native display module through a dynamic loading module, wherein the dynamic loading module invokes the first display module or the second display module.

3. The display method according to claim 2, wherein invoking the non-native display module through the dynamic loading module comprises:

obtaining an application parameter of the first application through the dynamic loading module, wherein the application parameter indicates a display refresh frequency; and when the display refresh frequency indicated by the application parameter is above a preset threshold, invoking the first display module through the dynamic loading module.

4. The display method according to claim 3, wherein invoking the non-native display module through the dynamic loading module further comprises:

when the display refresh frequency indicated by the application parameter is below or equal to the preset threshold, invoking the second display module through the dynamic loading module.

5. The display method according to claim 4, wherein drawing the display interface of the first application based upon the non-native display module comprises:

when the non-native display module is the second display module, creating a first display layer via a standard NativeSurface interface in the Android system; and
fusing the first display layer with a created display layer to draw the display interface.

6. The display method according to claim 4, wherein after when the first application is the non-Android application, invoking the non-native display module, the display method further comprises:

starting a hardware acceleration module, wherein the hardware acceleration module is configured to provide data channel for display data of the first application, and to transmit the display data through the data channel.

7. The display method according to claim 3, further comprising:
receiving a third instruction, wherein the third instruction is configured to start a third application;

when the third application is the non-Android application and the first application is the non-Android application, backing up display data of the first application into a buffer area; and
recovering the backed-up display data into a graphics random access memory unit when switching from the third application to the first application.

8. The display method according to claim 1, further comprising:
receiving a fourth instruction, wherein the fourth instruction is configured to start a fourth application;
when the fourth application is the non-Android application, backing up display data of the first application into a buffer area; and
recovering the backed-up display data into a graphics random access memory unit when switching from the fourth application to the first application.

9. The display method according to claim 1, wherein determining whether the first application is the non-Android application, upon reception of the first instruction comprises:
obtaining a configuration parameter of the first application upon reception of the first instruction, wherein the configuration parameter indicates an application type; and
determining whether the first application is the non-Android application according to the configuration parameter.

10. The display method according to claim 1, wherein determining whether the first application is the non-Android application, upon reception of the first instruction comprises:
transmitting a request message to a server upon reception of the first instruction, wherein the request message requests for a configuration parameter of the first application, and the configuration parameter indicates an application type; and
receiving the configuration parameter from the server; and
determining whether the first application is the non-Android application according to the configuration parameter.

11. A terminal device, comprising:
at least one processor; and
at least one memory connected with the at least one processor,
wherein the memory stores instructions executable by the at least one processor, and the at least one processor is configured to execute the instructions stored in the memory:
upon reception of a first instruction, to determine whether a first application is a non-Android application, wherein the first instruction is configured to start the first application;
when the first application is the non-Android application, to invoke a non-native display module; and
to draw a display interface of the first application based upon the non-native display module;
when the first application is an Android application, to invoke a native display module, and create a Surface display layer of the first application to draw the display interface of the first application, wherein the native display module is a local display module customized based upon a standard application framework layer of the Android system;
to receive a second instruction, wherein the second instruction is configured to start a second application;

when the second application is an Android application and the first application is the non-Android application, to back up display data of the first application into a buffer area, and recover the backed-up display data into a graphics random access memory unit when switching from the second application to the first application;

when the second application is an Android application and the first application is the Android application, create a Surface display layer of the second application to draw a display interface of the second application; and invoke the Surface display layer of the first application when switching from the second application to the first application.

12. The terminal device according to claim 11, wherein the non-native display module comprises a first display module and a second display module, wherein the first display module is a display module based upon a non-Android system, and the second display module is a display module customized based upon a non-standard application framework layer of the Android system; and the processor is configured to invoke the non-native display module through a dynamic loading module, wherein the dynamic loading module invokes the first display module or the second display module.

13. The terminal device according to claim 12, wherein the processor is configured to obtain an application parameter of the first application through the dynamic loading module, wherein the application parameter indicates a display refresh frequency; and when the display refresh frequency indicated by the application parameter is above a preset threshold, invoke the first display module through the dynamic loading module.

14. The terminal device according to claim 13, wherein the processor is configured to, when the display refresh frequency indicated by the application parameter is below or equal to the preset threshold, invoke the second display module through the dynamic loading module.

15. The terminal device according to claim 14, wherein the processor is configured, when the non-native display module is the second display module, to create a first display layer via a standard NativeSurface interface in the Android system; and to fuse the first display layer with a created display layer to draw the display interface.

16. The terminal device according to claim 13, wherein the processor is configured, after the non-native display module is invoked when the first application is the non-Android application, to start a hardware acceleration module, wherein the hard acceleration module is configured to provide data channel for display data of the first application, and to transmit the display data through the data channel.

17. A non-transitory computer storage medium storing computer program that, when executed by a processor, cause the processor to perform:

upon reception of a first instruction, determining whether a first application is a non-Android application, wherein the first instruction is configured to start the first application;

when the first application is the non-Android application, invoking a non-native display module; and drawing a display interface of the first application based upon the non-native display module;

when the first application is an Android application, invoking a native display module, and creating a Surface display layer of the first application to draw the display interface of the first application, wherein the native display module is a local display module customized based upon a standard application framework layer of the Android system;

receiving a second instruction, wherein the second instruction is configured to start a second application;

when the second application is an Android application and the first application is the non-Android application, backing up display data of the first application into a buffer area; and recovering the backed-up display data into a graphics random access memory unit when switching from the second application to the first application;

when the second application is an Android application and the first application is the Android application, creating a Surface display layer of the second application to draw a display interface of the second application; and invoking the Surface display layer of the first application when switching from the second application to the first application.

* * * * *